United States Patent Office 3,162,214
Patented Dec. 22, 1964

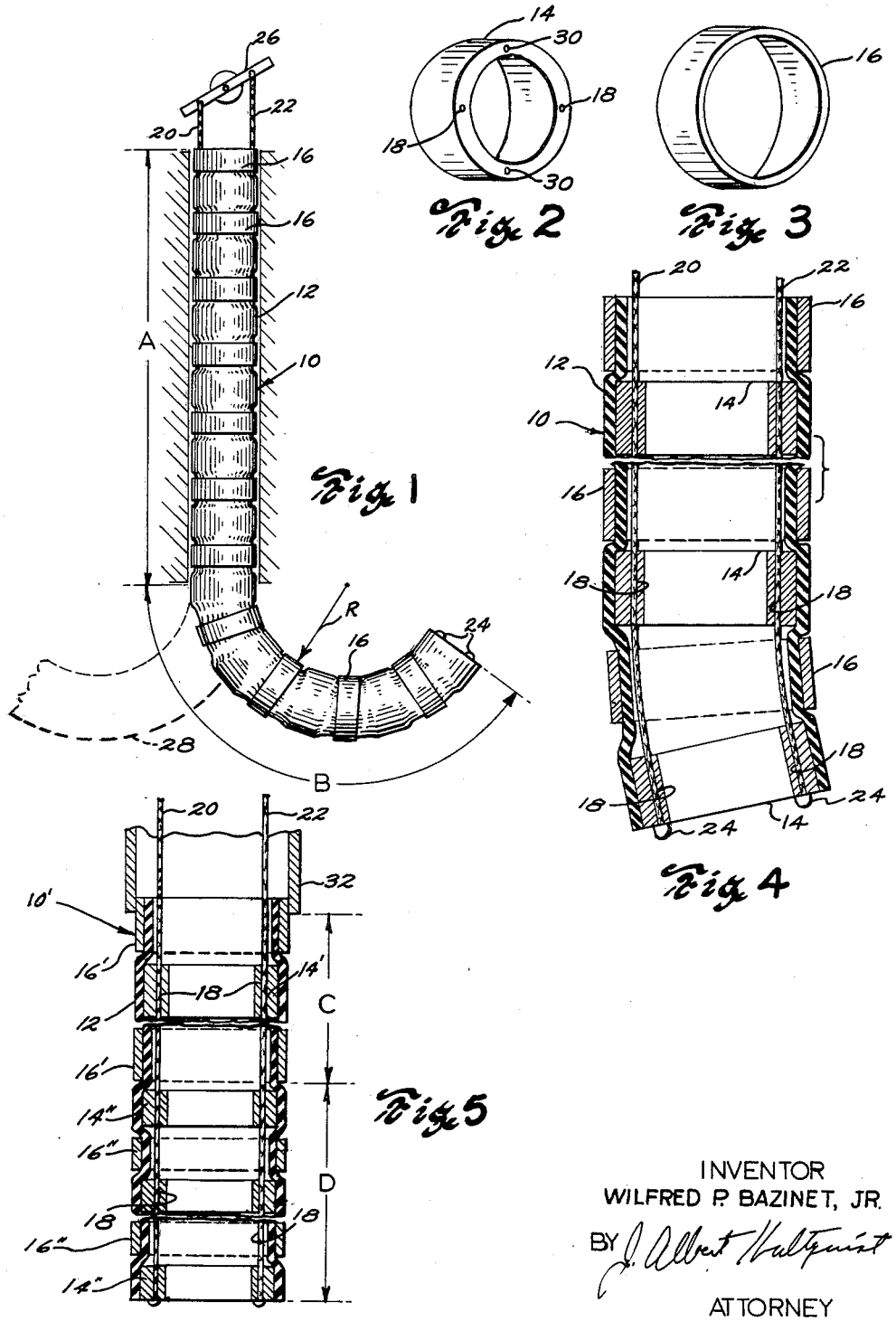

3,162,214
FLEXIBLE TUBULAR STRUCTURES
Wilfred P. Bazinet, Jr., Webster, Mass., assignor to American Optical Company, Southbridge, Mass., a corporation of Massachusetts
Filed Jan. 16, 1963, Ser. No. 251,974
4 Claims. (Cl. 138—120)

This invention relates to flexible tubular structures and particularly to a structure capable of being manipulated adjacent one of its ends for controlled flexing thereof.

The invention contemplates the provision of a flexible tubular structure which may be controlled as to its extent and radius of curvature when flexed and which is adapted to house optical viewing means and/or instruments for use in endoscopic examination or treatment. While the structure of the invention is particularly adapted for medical endoscopic devices, it has utility in other fields as a housing for tools, instruments or viewing devices required to be extended around corners or into normally inaccessible places.

An object of the present invention is to provide a flexible tubular structure adapted to be manipulated adjacent one of its ends for controlled flexing thereof.

Another object is to provide for the housing of viewing devices, instruments or tools and for controlled manipulation thereof.

A further object is to provide a structure of the above character which is simple in construction, economical to manufacture and easily assembled or disassembled for purposes of cleaning and/or replacement of various elements thereof.

To attain the aforesaid objects and others which may appear from the following description, in accordance with the principles of my invention, I provide a tubular structure including a continuous relatively thin walled tube formed of elastic material which is supported throughout its length by a series of rigid rings. Two sets of rings are provided, one of which comprises a type having an outside diameter slightly larger than the normal or relaxed inside diameter of the elastic tube and the other set comprises a type having an inside diameter of approximately the same dimension as the outside diameter of rings of said first mentioned type.

Rings of the first mentioned type are placed internally of the elastic tube and spaced from one another by rings of the latter type which are positioned over the tube. Respective rings in the series thereof are brought into spaced adjacent end-to-end relation with each other along the length of the tube with the spacing therebetween being approximately equal to or slightly greater than the thickness of the elastic tube. Inner rings are each provided with one or more pairs of diametrically opposed openings extending longitudinally through their side walls. Corresponding openings in respective inner rings are substantially coaxially aligned with each other throughout the length of the tubular structure. Wires or cables for manipulating the tubular structure are extended through the openings in the inner rings and are anchored at their one ends to the last of said inner rings adjacent the distal end of the structure. Opposite ends of the cables extend outwardly of the proximal end of the structure to permit manipulation thereof. A pulling force applied to one cable of a diametrically opposed pair thereof will produce flexing or bending of the tubular structure in the plane defined by the pair of cables and the direction of bending will be toward the side adjacent the cable being pulled.

As a result of the tube being elastic in nature, bending of the structure will take place at locations along its length between adjacent ends of the respective inner and outer rings in the series thereof while the cross-section of the structure will remain substantially constant at all times so that a crimping effect on articles supported therein will not be realized.

The extent of flexing is determined by the amount of force exerted on the cable and, as it will become apparent hereinafter, the structure when flexed will assume a circular shape.

The bending radius of the tubular structure and its general overall flexibility is determined by the lengths of respective rings used to support the tube. That is, rings of shorter axial dimension will permit bending about smaller radii of curvature and provide for increased flexibility of the structure as a whole. Longer rings will limit bending to larger radii of curvature and produce a more rigid overall structure.

The flexibility and bend radius of the tubular structure may be planned by selection of the lengths of rings used to support the elastic tube which will conform readily to substantially any degree of bending by stretching between respective adjacent ends of the inner and outer rings at one side of the structure and compressing between respective rings at the opposite side of the structure.

It is pointed out that the invention provides a tubular structure wherein the elastic tube, being continuous from end-to-end, forms a protective covering for instruments or the like intended to be extended thereinto.

The invention will be more fully understood by reference to the following detailed description which is accompanied by drawings in which FIG. 1 illustrates, in elevation, an embodiment of the present invention;

FIGURES 2 and 3 are enlarged perspective views of supporting rings used in the construction of the embodiment shown in FIG. 1;

FIG. 4 illustrates, in enlarged form, a longitudinal cross-section of the improved flexible tubular structure of the invention; and FIG. 5 is a view similar to FIG. 4 illustrating a modification of the invention.

Referring now to the drawings, there is shown in FIG. 1 a flexible tubular structure 10 constructed in accordance with the invention.

As shown in more detail in FIG. 4, structure 10 comprises continuous elastic tube 12 which forms the side wall of structure 10. Tube 12 is supported throughout its length by a series of rigid rings 14 and 16 which are fitted thereto and positioned in adjacent end-to-end relation with each other.

Rings 14, being of one type, are provided with relatively thick side walls and are of an outside diameter somewhat larger than the normal or relaxed inside diameter of tube 12. Rings 16, being of another type, are provided with relatively thin side walls of a thickness approximately equal to that of tube 12 and have an inside diameter approximately equal to the outside diameter of rings 14. Thus, the outer surface of the assembled structure is of substantially constant diameter except at the zones between rings. As it can be seen in FIGS. 2 and 4, rings 14 are each provided with diametrically opposed openings 18 extending longitudinally through their side walls. When rings 14 are positioned internally of tube 12 as shown in FIG. 4, corresponding openings 18 in respective rings 14 are coaxially aligned and wires or cables 20 and 22 are extended therethrough to provide means for flexing structure 10. Cables 20 and 22 may be in the form of wires or structural cordage of natural or synthetic filamentary materials.

One end of each of the cables 20 and 22 is anchored to the particular ring 14 nearest the distal end of structure 10 (see FIG. 4). If the cables are in the form of stranded cords or the like, anchoring or their one ends may be accomplished simply by providing a knot at said ends which is larger than openings 18. Alternatively, direct or indirect connection of the ends of cables 20 and 22 to a ring 14 may be made by swaging, cementing or otherwise connecting beads 24 or the like to cables 20 and 22 as illustrated in FIG. 4. Beads 24 may be cemented, welded or otherwise attached to ring 14 if desired. Wedges might also be used to secure cables 20 and 22 in openings 18.

In making the assembly of structure 10, a first ring 14 having cables 20 and 22 extended through its openings 18 is placed internally of tube 12 adjacent one of its ends thereby causing tube 12 to expand and elastically grip first ring 14. Cables 20 and 22 are extended from first ring 14 through tube 12 outwardly of its opposite end and a ring 16 is slipped over tube 12 adjacent said opposite end thereof. This ring 16 is then brought into adjacent end-to-end relation with first ring 14 with a spacing being provided therebetween which is approximately equal to or only slightly greater than the thickness of tube 12. In this way, tube 12 forms a flexible connection between adjacent rings 14 and 16 which permits flexing of the final structure 10 substantially without alteration of its cross-sectional size at points between respective adjacent rings 14 and 16. A second ring 14 is threaded onto cables 20 and 22 and fitted internally of tube 12. Second ring 14 is then moved into adjacent end-to-end spaced relation with ring 16 previously applied. Cables 20 and 22 are held taut and are disposed in the plane of openings 18 in first ring 14 of the assembly so as to cause corresponding openings 18 in second ring 14 to become aligned with openings in first ring 14. A second ring 16 is then fitted over tube 12, another ring 14 is placed internally of tube 12 and so on until structure 10 is built up to a desired length. If it is desired to shorten the tubular structure at any time or to disassemble the same for purposes of cleaning or replacement of one or more of its parts, reversal of the above assembly procedure would be followed.

In operation, a pulling force applied to one of the cables 20 or 22 causes a flexing of the distal end portion of structure 10 as shown in FIG. 1. Flexing will take place at the connections made by tube 12 between adjacent ends of rings 14 and 16. In flexing, respective portions of tube 12 between rings 14 and 16 will stretch at the side of structure 10 opposite to the cable having a pulling force applied thereto and become compressed at the side of structure 10 adjacent the cable having a pulling force applied thereto. In FIG. 1, cable 22 is illustrated as having a pulling force exerted thereon by counterclockwise rotation of lever 26. Lever 26 is shown for purposes of illustration only and may be replaced by a pulley or the like or cables 20 and 22 may be operated without such devices if it is so desired.

When structure 10 is restrained throughout section A thereof as illustrated in FIG. 1, its free end section B will flex or bend independently of section A in response to a pulling force applied to one of the cables 20 or 22. A minimum radius of bend R is determined by the lengths of rings 14 and 16. Rings 14 and 16 of shorter axial length will permit bending about a shorter radius R and longer rings 14 and 16 will limit bending to a longer radius R. Thus, it can be seen that a desired minimum radius of bend throughout a predetermined length of structure 10 can be planned at the time structure 10 is made up by providing rings 14 and 16 of controlled lengths. The amount of flexing or bend which is imparted to structure 10 is determined by the pull exerted on cable 22.

It should be understood that without section A of structure 10 being restrained as shown in FIG. 1, bending will take place throughout the entire length of structure 10 when a pulling force is exerted on cable 22.

Bending of structure 10 in the direction indicated by dot-dash outline 28 can be effected by rotating lever 26 clockwise as viewed in FIG. 1 to apply a pulling force to cable 20. It is pointed out that, if universal bending of the structure 10 is desired, rings 14 might be provided with a second pair of diametrically opposed openings 30 (see FIG. 2) disposed in a plane normal to the plane of openings 18. In this way, a second set of cables like cables 20 and 22 might be threaded through openings 30 and anchored adjacent the distal end of structure 10. Operation of this second set of cables would produce a flexing of the tubular structure in a plane normal to the direction of flexing illustrated in FIG. 1.

In the modification shown in FIG. 5, rings of different axial lengths are used in the construction of tubular structure 10'. Thus, section C of structure 10' having the longer rings 14' and 16' will be less flexible and have a longer radius of bend than section D.

By the provision of shorter rings 14" and 16" in section D, this section will be capable of being flexed about a shorter radius of bend than section C.

It is also illustrated in FIG. 5 that a flexible tubular structure of the type embodying this invention may be fitted to a rigid or semi-rigid tube or casing 32 if it is desired to provide such a casing with a flexible terminal end section which can be manipulated independently of casing 32.

A typical tubular structure constructed according to the principles set out above might embody a tube 12 formed of rubber of the type used for conventional medical sleeving with rings 14 and 16 formed of a rigid plastic such as nylon.

The invention, however, is not limited to the use of any particular materials in the fabrication of the flexible tubular structure. The selection of materials would be made in accordance with the intended use of the flexible tubular structure. For different applications it might be desirable to form tube 12 of different types of natural or synthetic rubber or a woven elastic type sleeving. Rings 14 and 16 may be formed of any rigid plastic material or metal.

Since the flexible tubular structure is adapted to a variety of uses, the sizes of its various parts would be determined accordingly. As a gastroscope, for example, it might have an outer diameter of approximately one centimeter or less. For other purposes such as in the machine tool trade, it might be as much as one or more inches in diameter.

From the foregoing it can be seen that the present invention provides a flexible tubular structure having a continuous side wall for the protection of tools, optical viewing systems, instruments or other forms of equipment which might be housed therein. The structure may be easily assembled and disassembled for purposes of cleaning or replacement of parts thereof and it may be formed to any desired length.

I claim:

1. A flexible tubular structure of the character described comprising a tube formed of elastic material, a series of rigid rings fitted to said tube in adjacent end-to-end relation with each other along the length thereof, said rings in said series being alternately positioned internally and externally of said tube with the intermediate sections of said tube alone providing connections therebetween which are universally flexible, the rings disposed internally of said tube each having a number of pairs of diametrically opposed openings extending longitudinally through the side walls thereof, said openings in each internally disposed ring being aligned with corresponding openings in preceding and succeeding similar rings, a like number of pairs of cables extending respectively through said pairs of aligned openings in each of said alternate rings, and means adjacent one end of said structure for preventing withdrawal of said cables in a direction toward the opposite end of said structure so that universal flexing of said structure can be effected by differentially varying the tension of the cables of each pair thereof.

2. A flexible tubular structure of the character described comprising a tube of elastic material, a series of rigid ring-like members fitted to said tube in adjacent end-to-end relation with each other along the length thereof, a first set of said members being positioned internally of said tube, a second set of said members being positioned externally on said tube alternately between respective members of said first set with sections of said tube extending between successive internally and externally disposed ring-like members alone providing connections between said members which are universally flexible, each of said first set of members having at least one pair of diametrically opposed openings extending longitudinally through the side walls thereof, said openings being aligned with corresponding openings in preceding and succeeding similar members, a pair of cables extending through respective aligned openings in said first set of members, one end of each of said cables being secured to a ring-like member adjacent one end of said structure and opposite ends of said cables being accessible at the opposite end of said structure for manipulation to effect flexing of said structure.

3. A flexible tubular structure of the character described comprising a continuous tube of elastic material having a substantially uniform wall thickness, a first set of rigid ring-like members having substantially identical outer diameters larger than the normal relaxed inner diameter of said tube, the ring-like members of said first set thereof being positioned internally of said tube in spaced end-to-end relation with each other with said tube being expanded in portions thereover, a second set of rigid ring-like members having substantially identical outer diameters approximately equal to the outer diametral size of expanded portions of said tube, said second set of members being positioned externally on said tube alternately between respective members of said first set and in adjacently spaced end-to-end relation therewith, sections of said tube in corresponding spaces between successive internally and externally disposed ring-like members alone providing connections between said members which are universally flexible, each member of said first set having a number of pairs of diametrically opposed openings extending longitudinally through the side walls thereof, corresponding openings in members of said first set being substantially axially aligned with each other, a like number of pairs of cables extending through said aligned openings, means securing one end of said cables to one of said members adjacent the distal end of said structure and opposite ends of said cables being accessible adjacent the proximal end of said structure for manipulation thereof to effect lateral flexing of said structure in sections thereof between said ring-like members.

4. A flexible tubular structure of the character described having proximal and distal opposite ends comprising a continuous tube of elastic material, a series of rigid ring-like members carried by said tube in adjacent end-to-end relation with each other, a first set of said members being positioned internally of said tube, a second set of said members being positioned externally on said tube alternately between and in adjacently spaced end-to-end relation with respective members of said first set, portions of said tube extending between successive ring-like members alone providing connections between said members which are universally flexible, each member of said first set thereof having two pairs of diametrically opposed openings extending longitudinally therethrough and aligned with corresponding openings in preceding members, a first pair of cables extending through one pair of said openings in at least some of said first set of members, a second pair of cables extending through the other pair of openings in at least some of said first set of members, the cables of one pair each having an end thereof connected to a selected ring-like member remote from the proximal end of said tubular structure, the cables of the other pair each having an end thereof connected to a selected ring-like member remote from the proximal end of said tubular structure and the opposite ends of all such cables being accessible adjacent the proximal end of said tubular structure for manipulation thereof to effect selective flexing of the structure.

References Cited in the file of this patent
UNITED STATES PATENTS

| | | |
|---|---|---|
| 3,006,662 | Katsuhara | Oct. 31, 1961 |
| 3,060,972 | Sheldon | Oct. 30, 1962 |
| 3,071,161 | Ulrich | Jan. 1, 1963 |